(12) United States Patent
Martich et al.

(10) Patent No.: US 11,788,565 B1
(45) Date of Patent: Oct. 17, 2023

(54) APPARATUS FOR ASSEMBLING TUBING STRUCTURES

(71) Applicant: CYRCO, INC., Greensboro, NC (US)

(72) Inventors: Mark E Martich, Greensboro, NC (US); Hayward Sean Levy, Winston-Salem, NC (US)

(73) Assignee: Cyrco, Inc., Greensboro, NC (US)

( * ) Notice: Subject to any disclaimer, the term of this patent is extended or adjusted under 35 U.S.C. 154(b) by 1,323 days.

(21) Appl. No.: 16/218,551

(22) Filed: Dec. 13, 2018

Related U.S. Application Data

(60) Provisional application No. 62/745,496, filed on Oct. 15, 2018, provisional application No. 62/727,694, filed on Sep. 6, 2018, provisional application No. 62/599,518, filed on Dec. 15, 2017.

(51) Int. Cl.
| | | |
|---|---|---|
| *F16B 7/04* | (2006.01) | |
| *F16B 7/18* | (2006.01) | |
| *F16B 21/08* | (2006.01) | |

(52) U.S. Cl.
CPC .............. *F16B 7/0446* (2013.01); *F16B 7/182* (2013.01); *F16B 21/086* (2013.01); *Y10T 403/7194* (2015.01); *Y10T 403/75* (2015.01)

(58) Field of Classification Search
CPC ...... E04B 2001/2418; E04B 2001/2454; F16B 5/0258; F16B 7/0446; F16B 7/0453; F16B 7/0473; F16B 7/18; F16B 9/054; F16B 19/02; F16B 21/08; F16B 21/086; Y10T 16/05; Y10T 403/32926; Y10T 403/32959; Y10T 403/33; Y10T 403/335; Y10T 403/71; Y10T 403/7123; Y10T 403/7194; Y10T 403/75
USPC ........ 403/158, 162, 167, 168, 384, 388, 400, 403/408.1; 16/2.1
See application file for complete search history.

(56) References Cited

U.S. PATENT DOCUMENTS

| | | | | |
|---|---|---|---|---|
| 4,576,764 | A | 3/1986 | Shepherd et al. | |
| 4,978,265 | A * | 12/1990 | De Wan | F16B 21/086 411/510 |
| 5,503,493 | A * | 4/1996 | Kato et al. | F16B 7/18 403/312 |
| 6,910,671 | B1* | 6/2005 | Norkus et al. | B62D 24/02 248/560 |
| 7,275,734 | B2 | 10/2007 | Bland et al. | |
| 7,682,117 | B2* | 3/2010 | Holt et al. | F16B 5/0266 403/408.1 |
| 9,234,368 | B2* | 1/2016 | Zhu | F16B 7/0446 |

(Continued)

FOREIGN PATENT DOCUMENTS

DE 19916098 A1* 10/2000 ................F16B 5/0258

OTHER PUBLICATIONS

Product Specification CES Shear Bearing Inserts," CE Shephard Company, L.P. Feb. 1, 2017.

*Primary Examiner* — Josh Skroupa
(74) *Attorney, Agent, or Firm* — MacCord Mason PLLC

(57) ABSTRACT

A structural supporting bearing is comprised of a flange with a hole in the center and a cylindrical hollow tube. The cylindrical tube section is inserted through an appropriately sized hole in hollow fiberglass plastic tubing. The flange creates a stop for the cylinder against the outer wall of the tube. The length of the cylindrical tube is sized to approximately one-half the cross-section of the tube, so as to allow a similar bearing to be mounted to the other side of the tube. A plurality of other structural members is placed over the flanges as desired. The aforementioned assembly is configured to receive a suitably sized bolt through it and be secured in place with a receiving nut.

12 Claims, 17 Drawing Sheets

(56) References Cited

U.S. PATENT DOCUMENTS

| | | | |
|---|---|---|---|
| 9,458,619 B2* | 10/2016 | Bowron et al. | F16B 7/0486 |
| 9,739,069 B2 | 8/2017 | Jiang et al. | |
| 10,208,779 B2* | 2/2019 | Schneider et al. | F16B 5/0258 |
| 2004/0197136 A1* | 10/2004 | Emin | F16B 5/0241 |
| | | | 403/280 |
| 2007/0295884 A1 | 12/2007 | Mockry et al. | 248/602 |
| 2021/0254785 A1* | 8/2021 | Hanratty | F16B 5/0258 |
| 2022/0034351 A1* | 2/2022 | Brigham et al. | F16B 19/02 |
| 2022/0170495 A1* | 6/2022 | Hanratty | F16B 5/0258 |

* cited by examiner

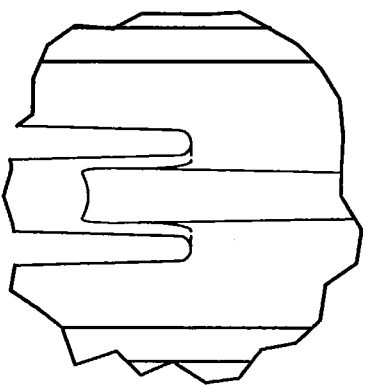
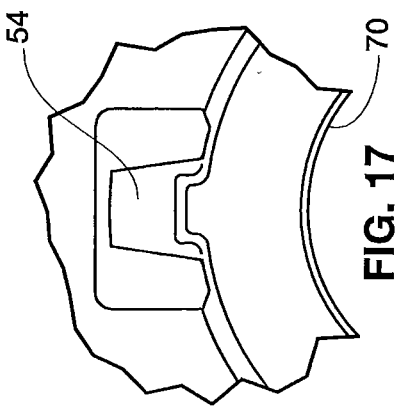
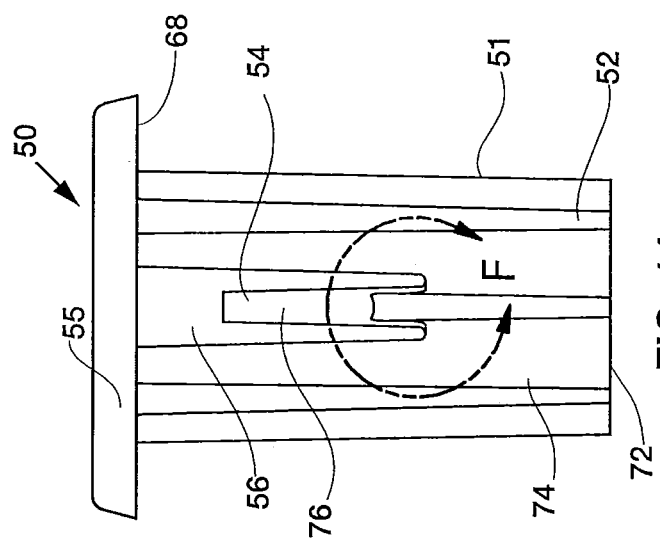
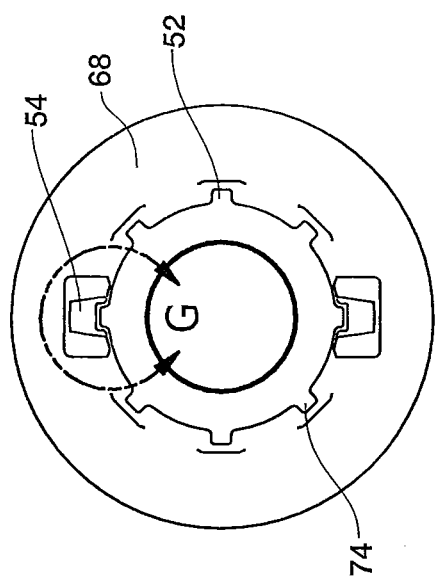

APPARATUS FOR ASSEMBLING TUBING STRUCTURES

FIELD OF THE INVENTION

The present disclosure relates to components used for the assembly of structural frames made of thermoset resin structural components that have been reinforced with fiberglass. This material is widely used in the structures of cooling towers.

BACKGROUND OF THE INVENTION

Cooling towers are heat exchangers widely used to dissipate low-grade heat into the atmosphere. The waste heat is a byproduct of common applications like electrical power generation, air conditioning and a wide variety of industrial processes. They typically reject the heat by exposing warm process water to air in an evaporative process. Cooling towers accomplish this by flowing the water (typically assisted by gravity) over a large surface area.

Materials used to construct the structures supporting the tower components have included concrete, metal, and lumber made from the Redwood or Douglas Fir varieties of natural wood. These materials offer a variety of attributes and disadvantages that manufacturers and users weigh when selecting a design for their application. More recently, a polymer material has been used that provides a different and unique set of characteristics. This polymer is typically an epoxy, vinyl ester, or polyester thermosetting resin that is reinforced with fiberglass. For the structural shapes discussed herein, it is usually produced in what is referred to as a "pultrusion" process. Commonly, this material is referred to as "FRP" for Fiberglass Reinforced Polymer.

Structural shapes are widely available from several suppliers that are specifically designed to mimic the dimensions found in the lumber typically used in construction: 2 x 4, 2 x 6, 4 x 4, etc. (nominal dimensions in inches). This is to allow for easy substitution of FRP for corresponding sizes of lumber. These shapes are not solid structural elements like lumber, however, but are instead have rectangular or square tubular and channel cross-sections. Substituting FRP structural shapes for lumber requires careful consideration of this difference, both in the design and the installation processes.

Use of FRP structural materials offers significant benefits over alternatives, including weight saving, corrosion and erosion resistance, and installed-cost savings over the expected life. Hence it is desirable to consider these materials for use in new and reconstructed cooling towers. However, the disadvantages arising from these not being solid members, and the measures taken to mitigate this have proven problematic and have introduced additional costs coming from added components, installation labor, and quality control concerns.

The present disclosure relates to an improved component for use when substituting FRP for lumber in structural applications to mitigate these complications.

FIG. 1 illustrates a typical design of a lumber cooling tower support structure where vertical columns are tied together with horizontal support members and diagonal bracing. The structure shown is on the order of seventy feet high, so workers at various levels need to use care to avoid danger. Attention to properly executing all required design details and avoiding unnecessary distractions is essential. Diagonal members supply the required stabilization against shear loads from severe weather, mechanical vibrations, seismic activity, etc. This example structure supports a cooling tower. But other similar supporting structures can be envisioned for this invention.

FIG. 2 details a typical connection designs for splicing vertical lumber columns 30 using FRP channel pieces 32. Standard commercial lengths of lumber are typically 16 to 20 feet, so splicing several pieces together is necessary for taller structures. These splices include bolts 34, washers 36 and nuts 39.

FIG. 3 shows the same splice detail where an FRP tube has been substituted for the solid lumber columns.

FIGS. 4 and 5 show a typical detail for connecting horizontal channel FRP members 38 to tubular FRP vertical columns 30 to tie them together.

FIG. 6 illustrates a fundamental drawback encountered when substituting tubular FRP material for solid lumber. The material does not provide sufficient flexural stiffness to support the compressive force exerted by the fastener as the nut is torqued to exert sufficient tightness in the connection. The sidewalls of the tubes can bow as at 43 and cracks 41 can develop in the area of the fasteners and at the tube's corners. FRP manufacturers recommend placing some form of solid spacer in the tube to mitigate this.

When using the typical ½-inch diameter stainless steel (S.S.) fasteners, the goal for tension in the connection is about 4,600 pounds, or 75% of the proof-stress of the fastener. This requires about 28-30 foot-pounds of torque be applied to a lubricated fastener system., However, this goal has proven to be elusive, as shown in the data in the table below. This data illustrates the response of the structural systems as the fastener is tightened:

| TORQUE VALUE (FT-LBS) | CHANNEL SPLICE | HORIZONTAL CHANNEL & TIE BAR |
|---|---|---|
| <10 | SPLIT WASHER-FLAT | SPLIT WASHER-FLAT |
| 10 | SNUG | SNUG |
| 11 | OK | OK |
| 12 | OK | OK |
| 13 | OK | OK |
| 14 | OK | OK |
| 15 | OK | OK |
| 16 | AUDIBLE STRESS | OK |
| 17 | BOWING STARTING | OK |
| 18 | BOWING WORSENING | AUDIBLE STRESS |
| 19 | INELASTICITY BEGINNING | AUDIBLE STRESS |
| 20 | INELASTIC FAILURE (FIG. 6) | BOWING STARTING |
| 21 | TEST STOPPED | INELASTICITY BEGINNING |
| 22 | TEST STOPPED | INELASTIC FAILURE (FIG. 6) |
| 23 | TEST STOPPED | TEST STOPPED |

As the data above indicates, there is a very narrow operating range before structural damage begins, and the goal of 28-30 foot pounds cannot be attained. Maintaining this narrow range is difficult to achieve and control consistently in the field since there can be many installers using a variety of different powered tools. Moreover, the tightness that the system will tolerate is questionable for long-term structural integrity. Even when the bolts seem tight and tension is controlled below the point of structural damage to the tubing, it has been noted that there is a relaxation of the FRP tubes over time due to creep. When returning to the structure after several months and reexamining the connections, the fasteners are frequently noted to be loose from creep and vibrations from operating equipment and require retightening.

One method that has been employed to improve the sheer load bearing capability of the connection is to install commercially available plastic bearings as shown in FIG. 7. The bearings provide a flange 44 to help distribute the force on the tube and also increase the ability of the connection to absorb shear load by increasing the shear bearing area in the connection. While improving shear load bearing capacity, this does not resolve the problems emanating from the control of the compression in the FRP tube.

A technique that has been used to both improve shear load bearing capability and mitigate this compression phenomenon is to install full-length metal tubes 46 (typically stainless steel) in the FRP tube. Compression of the metal tube relieves the forces on the FRP tube. Increasing the diameter of the metal tubes improves the ability of the connection to absorb shear loading and adequate tension in the fastener can be attained. While this is an adequate approach, the expense of providing stainless steel tubes that have been cut to the proper length and installed in the field is significant. More importantly, the length of the metal tubes must be tightly specified and controlled so as not to allow the FRP tube to crush.

Another way of making connections to FRP tubes is to consider them as "bearing-only" or "pinned connections". Implementation methods include a clevis pin and hairpin cotter retainer arrangement. This has been a compromise solution used in the industry to the problem of not significantly compressing the tube while avoiding the added cost of inserting spacer blocks or full-width support tubes. But these joints also pose problems. The pinned joints cannot provide any structural stiffness, and the clearance holes in the FRP are found to be elongated from wear over time.

There is a continuing need in the art for a low-cost way to address these issues.

SUMMARY OF THE INVENTION

The invention addresses one or more of these needs in the art by providing a structural supporting bearing to both increase the shear load-bearing capacity as well as protect the FRP tube connected to another item. The FRP tube is typically of square or rectangular cross section so as to have an outer cross dimension and an inner open space with an inner cross dimension. Coaxial holes are located in opposite sides of the FRP tube for connection purposes. The bearing may be a molded plastic item having a flange and a cylinder that has a bottom face at one end of the cylinder. The length of the cylinder is slightly greater than one half of the outer cross dimension of the FRP tube. An axial bore runs through the flange and cylinder. Two of the bearings can be inserted in opposition to one another into the holes on opposite sides of the FRP tube so that the distal ends of the cylinders of the bearings contact each other while the flanges of the bearings are slightly spaced from outside faces of the FRP tube. When a bolt is extended through the bores of the bearings, it can receive a nut, and the nut can be tightened onto the bolt to compress the bearing cylinders sufficiently so that the flanges are pressed into contact with the outside faces of the FRP tube.

In a preferred embodiment the nut can be tightened onto the bolt and compress the bearing cylinders together to develop a torque level that produces 75% of the bolt's maximum tensile stress. In an embodiment the cylinders are of a length so that the flanges of the bearings are spaced 0.005 inch from the outside faces of the FRP tube before being compressed by the nut and bolt. After tensioning, the flanges are in contact with the outer walls of the FRP tube. The resulting connection is commonly called a "friction-type" or "slip-critical", rather than pinned, producing a stiffer structural system.

The bore of the bearing is desirably tapered from a larger diameter at the flange to a smaller diameter around the middle of the cylinder. The bore may taper again to a larger diameter as it exits the distal end. This provides a "lead-in" for the bolt to enter the bearing at the flange and aligns the opposite receiving bearing.

The structural supporting bearing may have external ribs extending the length from the bottom face of the flange to the distal end of the cylinder, and there may be eight such ribs.

The cylinder preferably has a snap retention latch extending radially outward a distance that is larger than a diameter of the receiving hole in the side of the FRP tube. The snap retention latch may slope radially outward from the cylinder with the slope starting toward the distal end of the cylinder and ending at a location that is spaced below the flange and that extends radially outward a distance larger than a diameter of the hole in the side of the FRP tube. The latch may have a latch portion that is free of other cylinder material radially inward of the latch portion, so the latch portion can flex inward during insertion into the hole in the side of the FRP tube and return outward after clearing the hole in the side of the FRP tube. This prevents the bearing from falling out of the hole in the side of the FRP tube before being held in place with a nut and bolt.

The invention can also be considered as a structural element suitable for use in assembling a cooling tower. The element includes a tube made of Fiberglass Reinforced Polymer (FRP tube) of square or rectangular cross section so as to have an outer cross dimension and an inner open space with an inner cross dimension and having coaxial holes in opposite sides of the FRP tube, and two structural supporting bearings, one in each of the coaxial holes on opposite sides of the FRP tube to protect the FRP tube when the FRP tube is connected to another item with a nut and bolt. The bearing is a molded plastic item having a cylinder and a flange that has a bottom face at one end of the cylinder, an axial bore through the flange and cylinder. The cylinder has a length from the bottom face of the flange to a distal end of the cylinder that is slightly greater than one half of the outer cross dimension of the FRP tube. The distal ends of the cylinders of the bearings contact each other and the flanges of the bearings are slightly spaced from respective outside faces of the FRP tube. Thus, a bolt can be extended through the bores of the bearings and receive a nut on an opposite side of the FRP tube, and when the nut is tightened onto the bolt, the bearings compress sufficiently so that the flanges are pressed into contact with their respective outside faces of the FRP tube.

The cylinder may have a snap retention latch extending radially outward a distance that is slightly larger than a diameter of the hole in the side of the FRP tube that prevents the bearing from falling out of the hole in the side of the FRP tube before being held in place with a nut and bolt.

The invention can also be considered as a method of assembling a cooling tower including providing a structural tube made of Fiberglass Reinforced Polymer (FRP tube) of square or rectangular cross section that has an outer cross dimension and an inner open space with an inner cross dimension and having coaxial holes in opposite sides of the FRP tube. The method includes inserting two structural supporting bearings in each of the coaxial holes on opposite sides of the FRP tube until distal ends of the bearings contact one another and flanges on the bearings remain spaced slightly from respective outside faces of the FRP tube, extending a bolt through aligned bores in the bearings, and tightening a nut to a distal end of the bolt to compress the bearings sufficiently so that the flanges are pressed into contact with their respective outside faces of the FRP tube.

Tightening the nut may include compressing the flanges sufficiently to torque the bolt to 75% of the maximum rating of the bolt.

Inserting two structural supporting bearings may include flexing snap retention latches on the bearings to prevent the bearings from falling out of the hole in the side of the FRP tube before being held in place with a nut and bolt.

The invention may also be considered as a bearing for use together with a hollow FRP having outer sidewalls to span a gap in the FRP between the sidewalls to prevent excess compression by a bolt and nut passing through holes the sidewalls and gap. The bearing has a length shorter than the gap in the FRP so two opposed ones of the bearing together substantially span the gap in the FRP when a bolt is passed through the bearing and tightened with a nut. The bearings have barbs with shoulders that catch on an inside face of holes in the FRP to hold the bearing in place on the FRP even before the bolt is inserted in the bearing.

BRIEF DESCRIPTION OF THE DRAWINGS

The invention will be better understood by a reading of the Detailed Description of the Examples of the Invention along with a review of the drawings, in which:

FIG. 14 is a side view of a second embodiment of the invention;

FIG. 15 is an enlarged bottom view of the second embodiment of the invention;

FIG. 16 is an enlarged partial side view of detail F of FIG. 14;

FIG. 17 is an enlarged partial view of detail G of FIG. 15;

DETAILED DESCRIPTION OF EXAMPLES OF THE INVENTION

This disclosure describes a structural bearing that is useful for connecting FRP structural elements. One embodiment is shown in FIGS. 9 through 13, and a second embodiment is shown in FIGS. 14 through 29.

Figure 1:
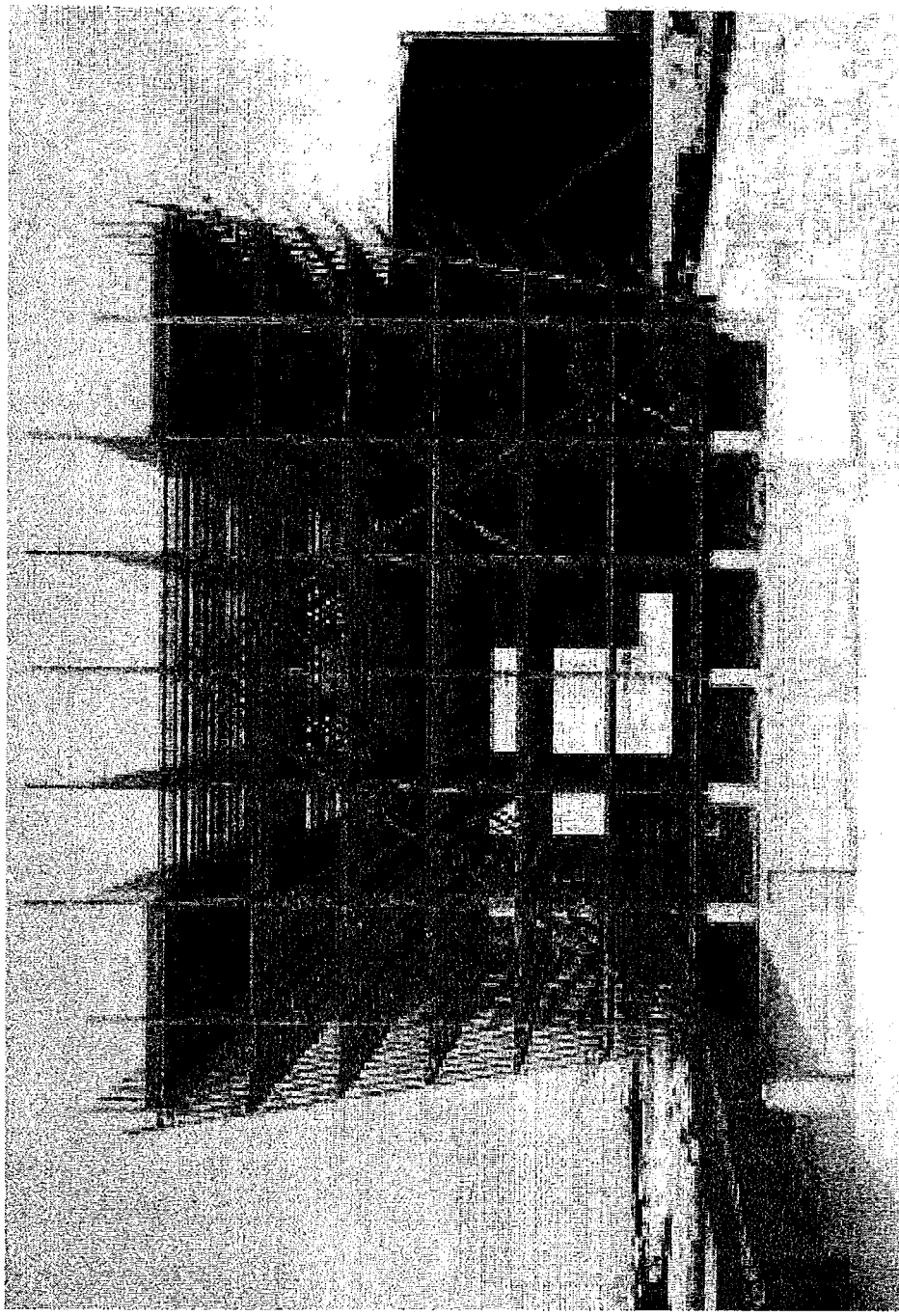
FIG. 1 is a perspective view of a prior art cooling tower support structure.
Figure 2:
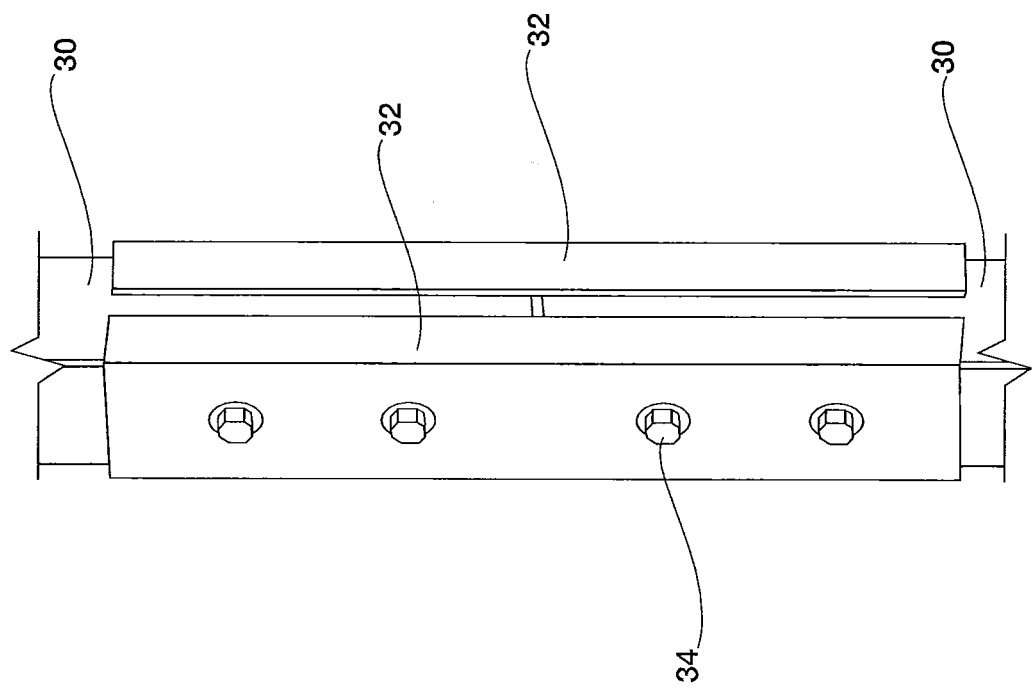
FIG. 2 is a side perspective view of a prior art lumber column splice using FRP channels.
Figure 3:
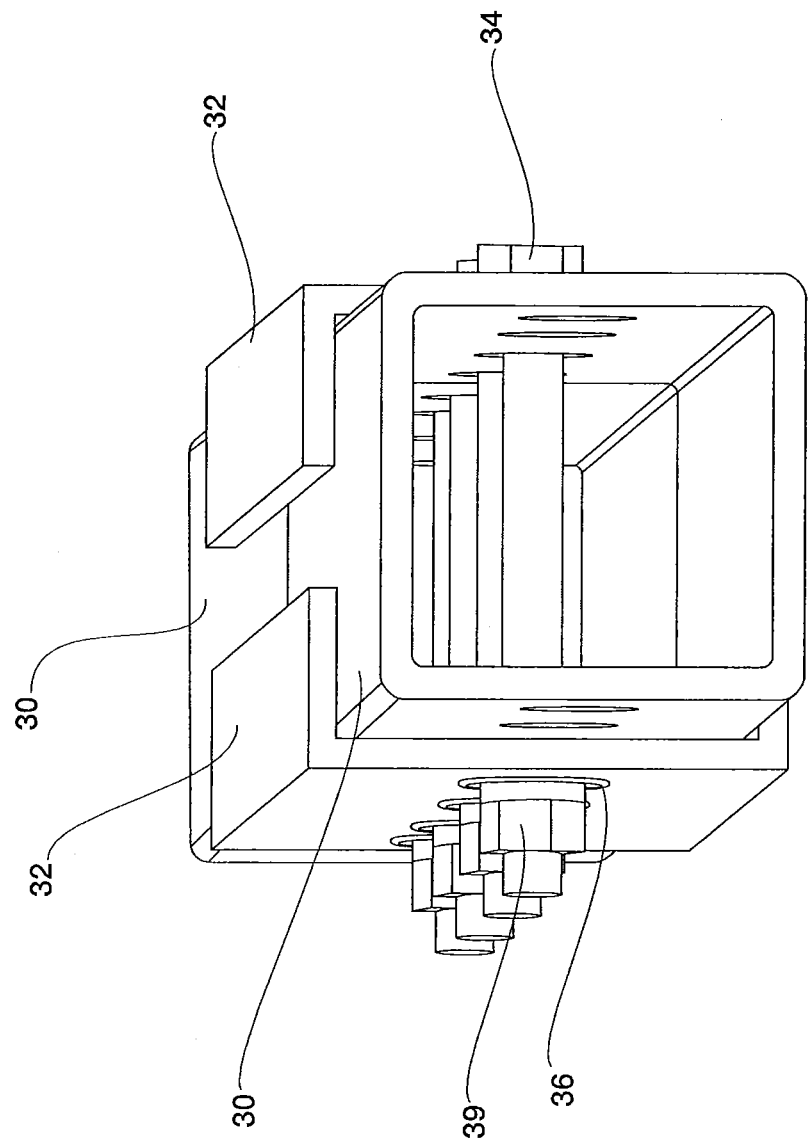
FIG. 3 is a side perspective view of a prior art FRP column splice using FRP channels.
Figure 4:
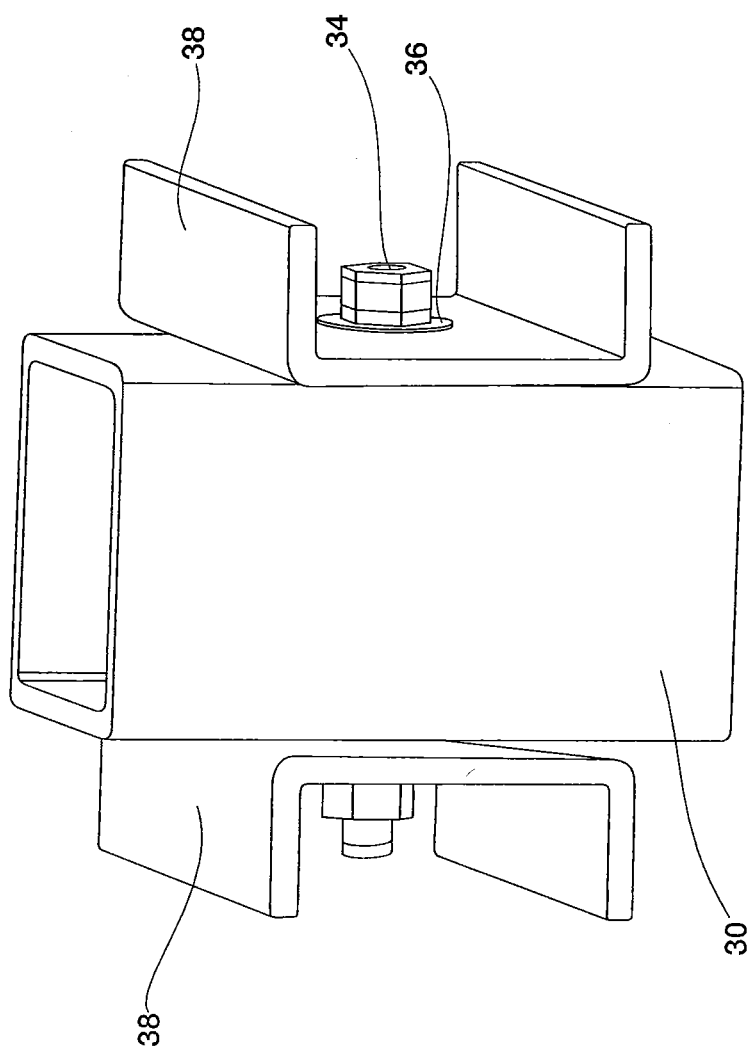
FIG. 4 is a side perspective view of a prior art horizontal channel connection to a column member.
Figure 5:
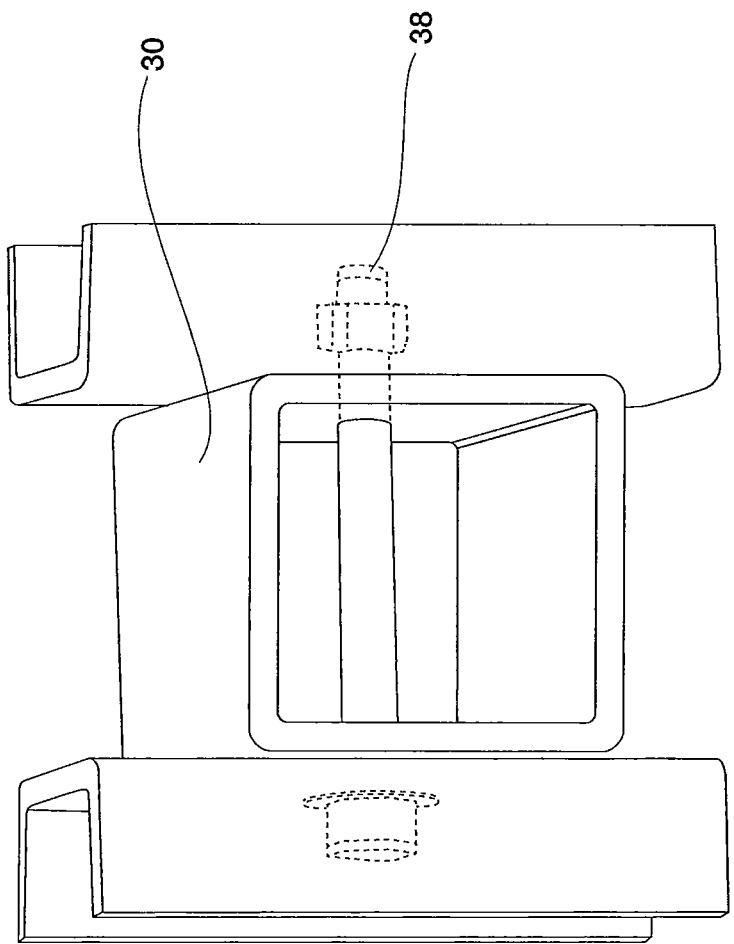
FIG. 5 is a bottom perspective view of a prior art horizontal channel connection to a column member.
Figure 6:
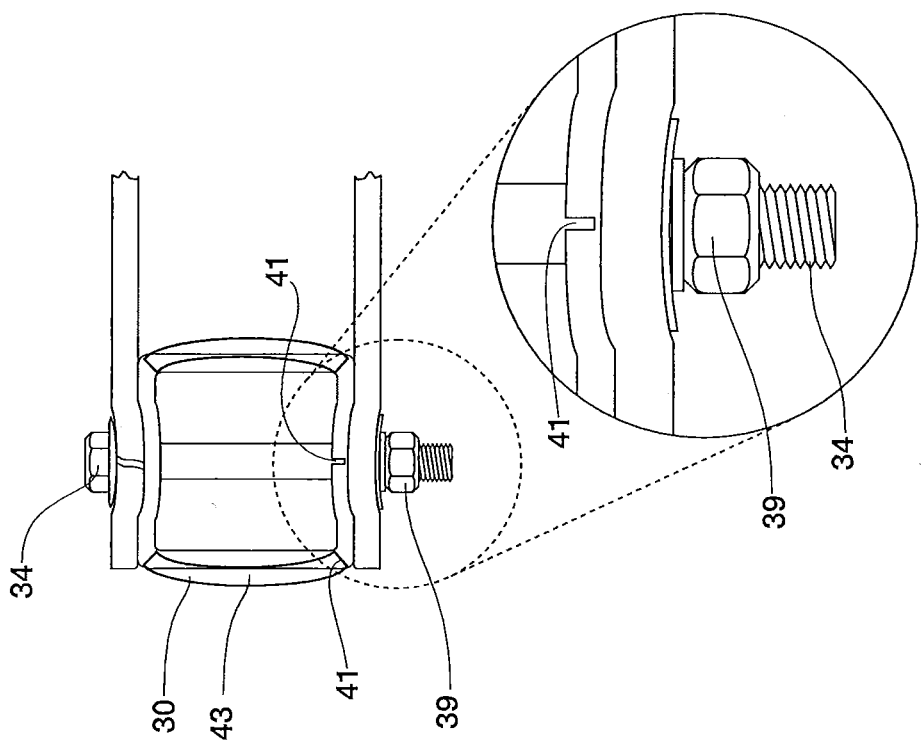
FIG. 6 a schematic view of a prior art column member showing distortions.
Figure 7:
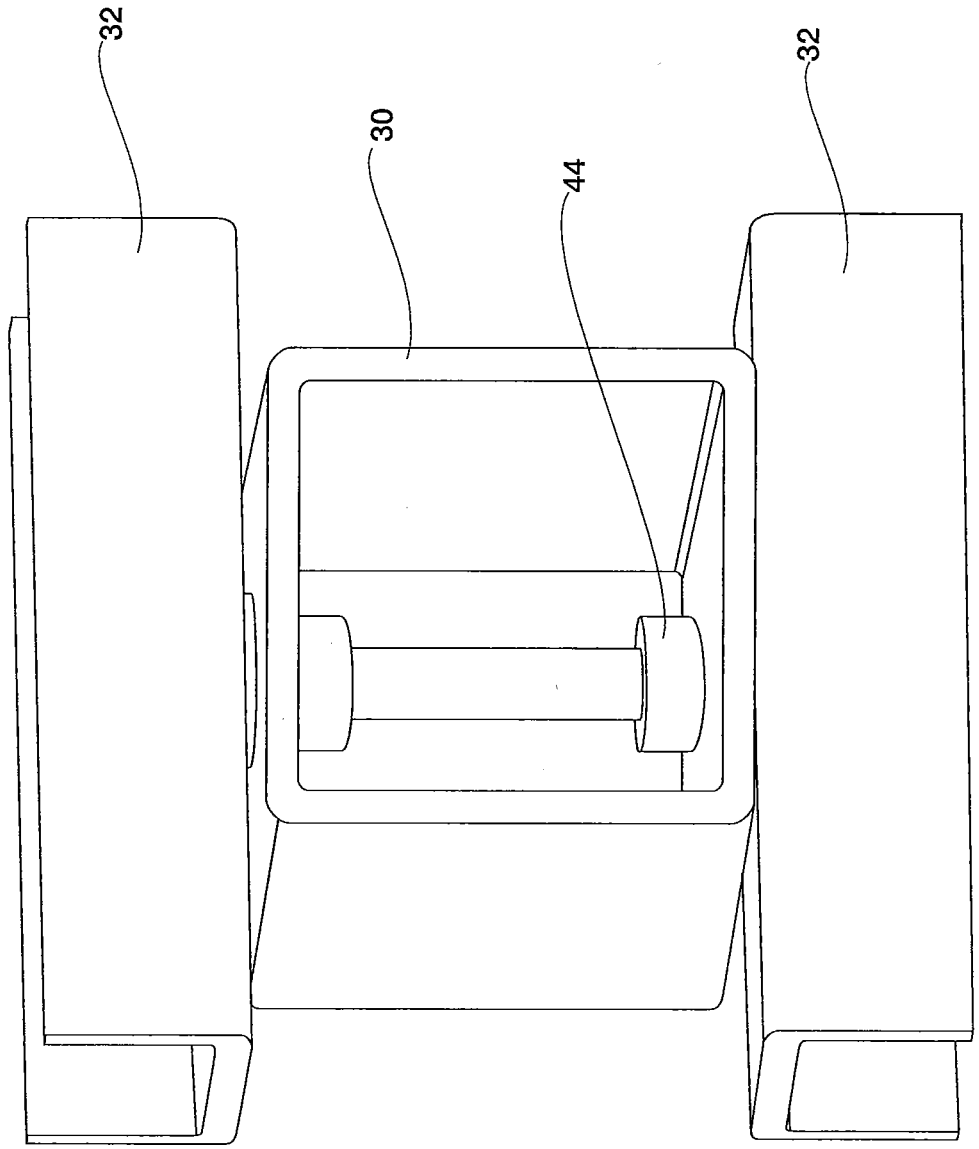
FIG. 7 is a bottom view of a horizontal channel connection with a prior art bearing.
Figure 8:
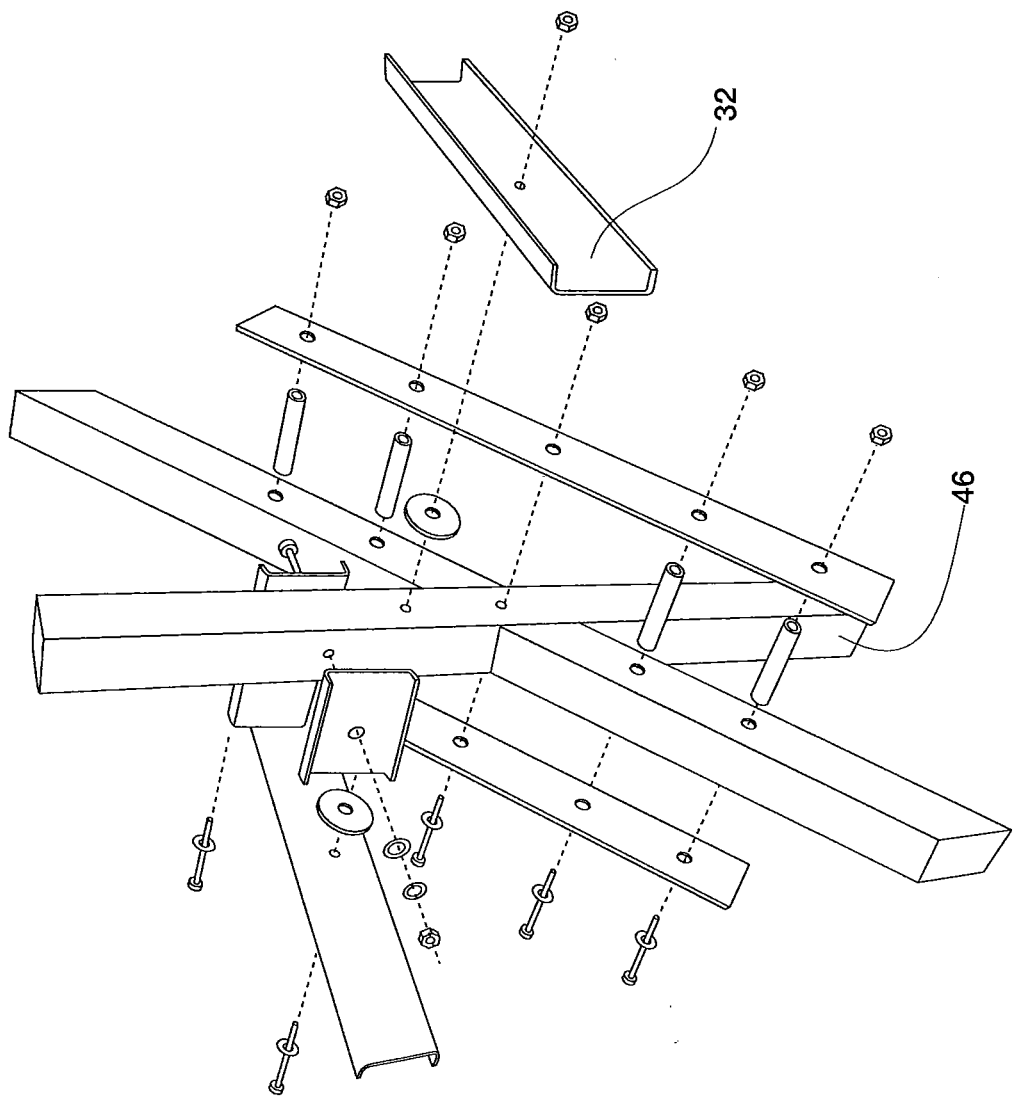
FIG. 8 is an exploded view of a prior art assembly using stainless steel tubes.
Figure 10:
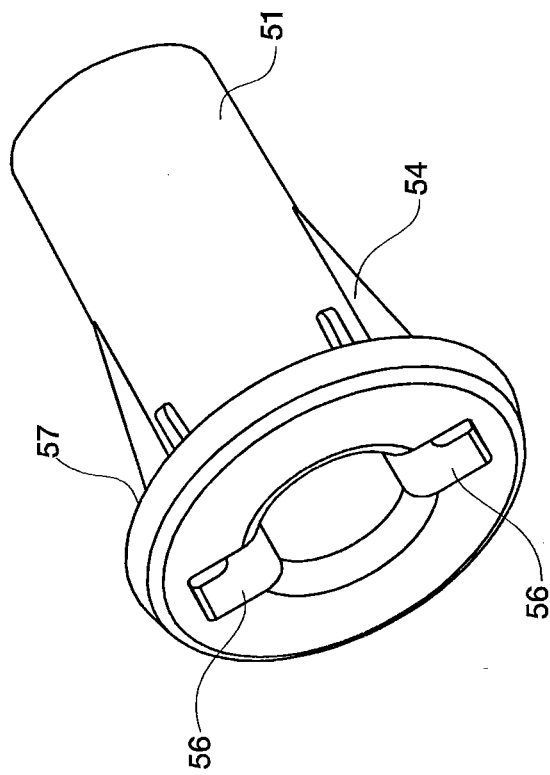
FIG. 10 is a top perspective view of a bearing according to a first embodiment of the invention.
Figure 9:
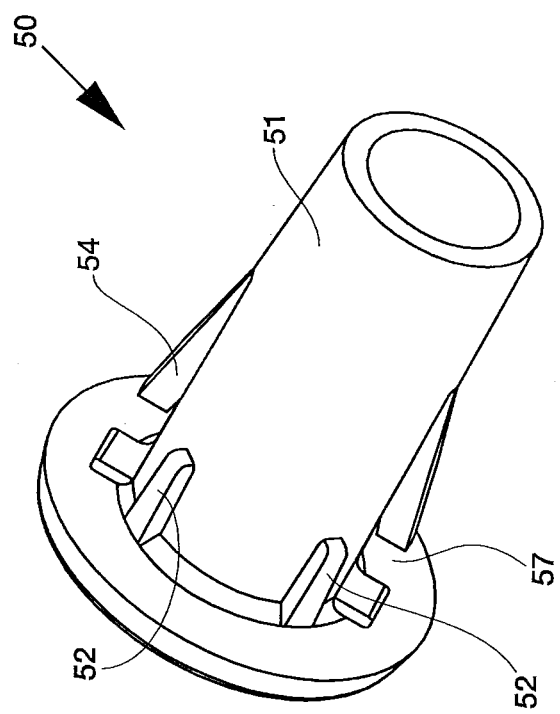
FIG. 9 is a bottom perspective view of a bearing according to a first embodiment of the invention.
Figure 11:
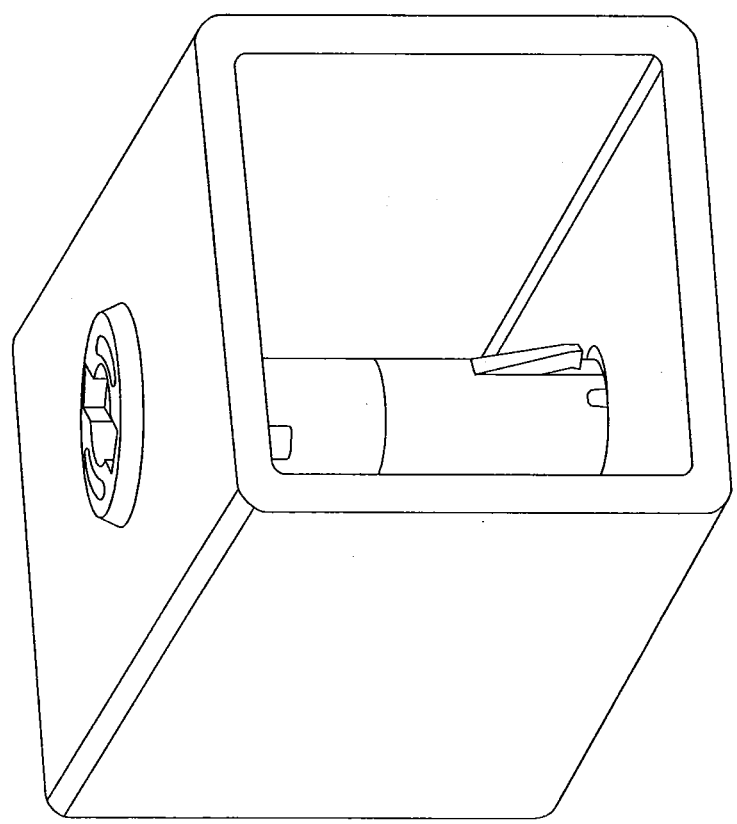
FIG. 11 is a view of two bearings installed in opposed sidewalls of an FRP tube.

FIG. 11 shows the bearings 50 installed in a FRP tube. The bearings are designed as cylinders 51 with compression ribs 52 that can hold them tightly in a 1.000-inch diameter hole. They also have snap retention latches 54 that secure them loosely in a larger hole, such as one that is up to 1.080 inches in diameter. A top flange 55 holds the bearing on the outside face of tube. A gap 57 between the flange 55 and the latches 54 provide space for the sidewall of the tube. This allows for a significant manufacturing tolerance to be allowed for the holes in the FRP. The retention feature allows the bearings to be factory installed or pre-installed in the field before the tower is erected. This saves considerable labor expense. The opening 56 enables the molding of the bearing in a single injection molding step, since the mold components can pass through the openings 56 to help shape the latches 54.

The draft required for the mold ejection of the bearing has been placed on the inside diameter of the bearing to break in approximately the center of the part. This results in a slight taper that allows for lead-in of the bolt into the bore and self-alignment of the bolt in the opposite bearing.

When the nut 34 and bolt 39 are tightened, the bearing cylinders 51 first compress before force develops on the FRP tube cross section.

As the torque applied to the nut 34 and bolt 39 is increased to develop the recommended 28-30 foot-pounds of tension in the fastener connection, the cylinders absorb the bulk of the reaction force required. The flange 55 distributes the remaining compressive load on the FRP tube, as do conventional bearings, but the flange 55 designed is much larger and thicker than is conventional to better distribute load and absorb shear and torsional forces. Thus, a friction-type connection is achieved.

Figure 12:
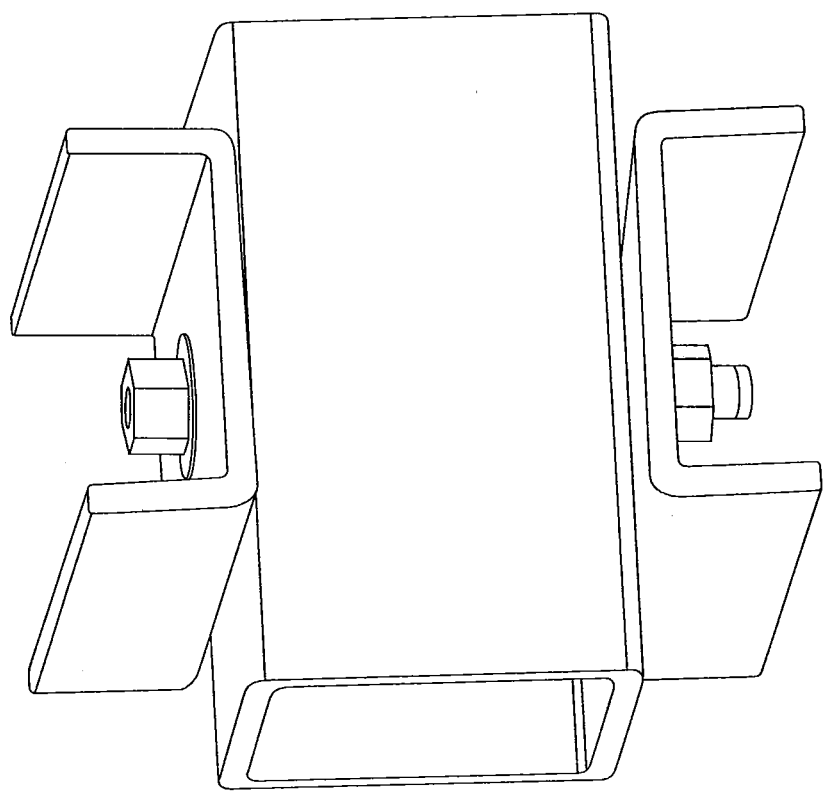
FIG. 12 is a side view of tube and channel with a bearing according to a first embodiment of the invention.
Figure 13:
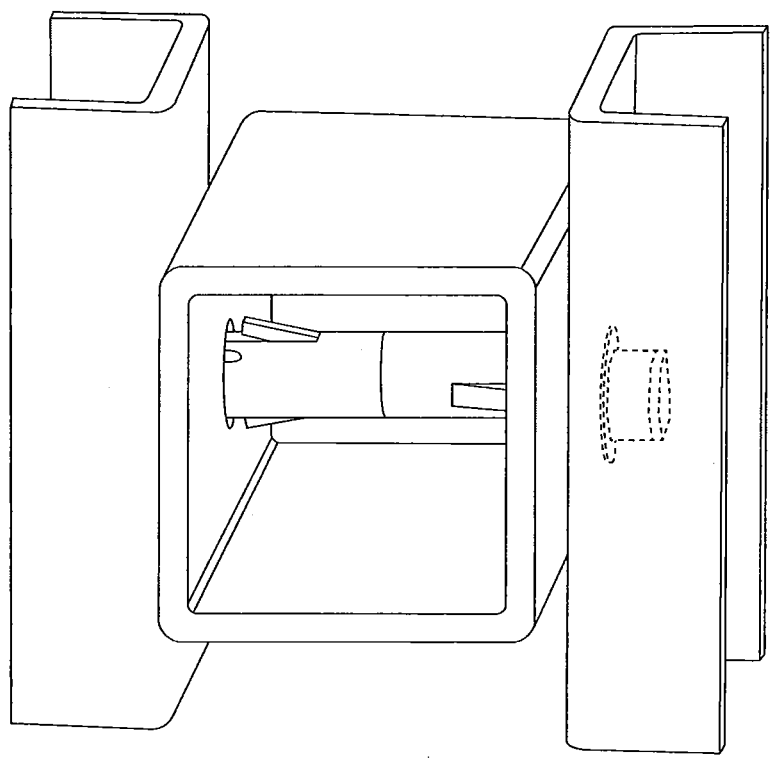
FIG. 13 is a bottom view of the tube and channel with a bearing according to a first embodiment of the invention.
Figure 19:
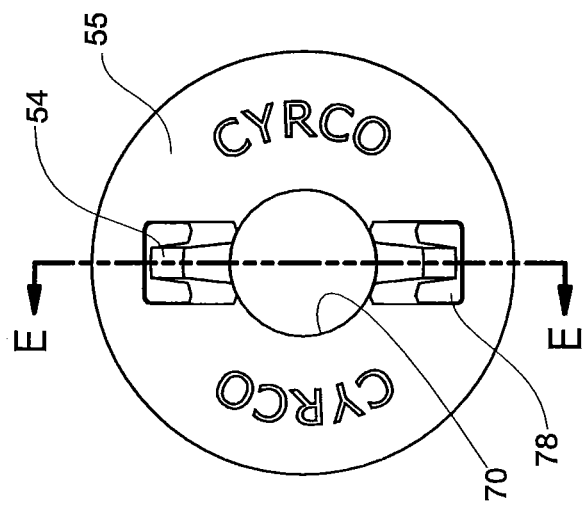
FIG. 19 is a top view of the second embodiment of the invention.
Figure 18:
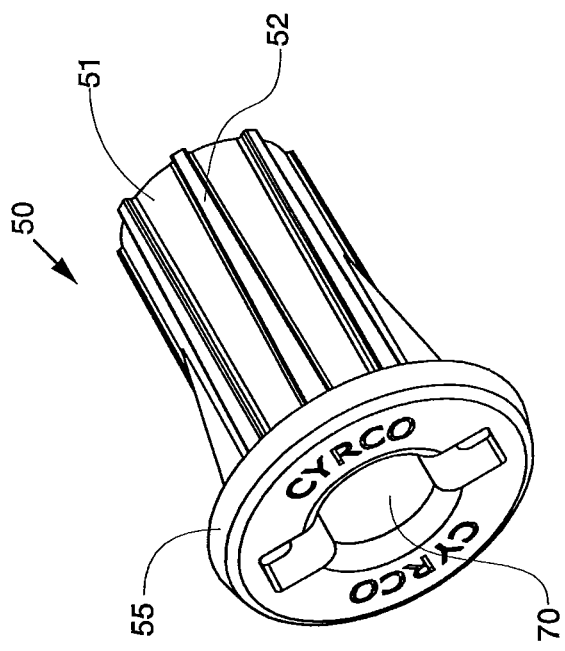
FIG. 18 is a top side perspective view of the second embodiment of the invention.
Figure 21:
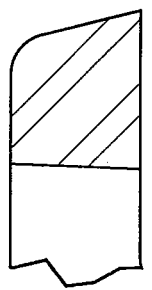
FIG. 21 is an enlarged partial view of detail G of FIG. 20.

The assembly shown in FIG. 11 serves as the basic structural element in the system. Various channels and flat straps can be assembled over this element and secured with the normal bolt-nut-lock washer system to build structures of infinite variety. An example showing horizontal channel members is shown in FIG. 12 and FIG. 13.

FIGS. 14-29 show a second, preferred embodiment. This embodiment differs in reducing the cylinder wall thickness and adding ribs. By reducing the thickness of the cylinder wall, the amount of material consumed is reduced, and the cycle time of the molding process is reduced, creating two sources of savings.

Figure 29:
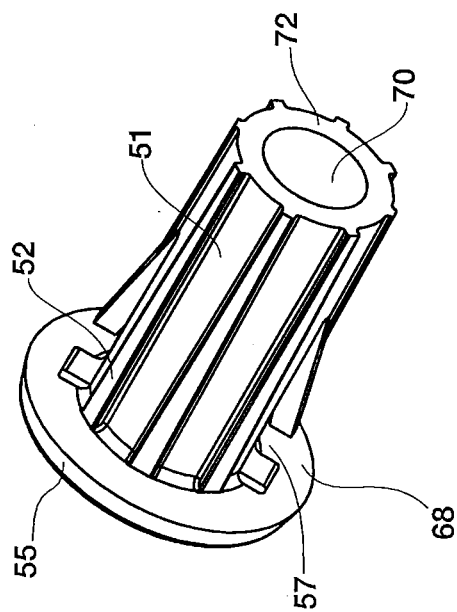
FIG. 29 is bottom perspective view of the second embodiment of the invention.
Figure 30:
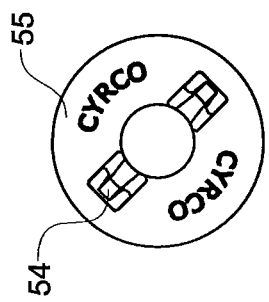
FIG. 30 is a top view of the second embodiment.
Figure 27:
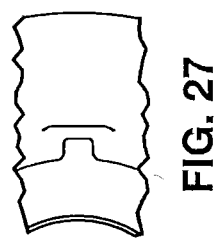
FIG. 27 is an enlarged partial view of detail D of FIG. 24.
Figure 28:
FIG. 28 is an enlarged partial view of detail D of FIG. 24.

As seen in FIGS. 14-29, the second embodiment of the bearing 50 is configured as a molded plastic item having a cylinder 51 and a flange 55 that has a bottom face 68 at one end of the cylinder 51. An axial bore 70 extends through the flange 55 and cylinder 51. As can be seen in particular in FIG. 23, the bore 70 is tapered from a wider end at the flange 55 to a narrower end at the distal end 72 of the cylinder 51, although a portion, particularly the portion closer to the distal end, can be untapered or have a reverse taper (widening) past a particular length 84 (See FIG. 20). The cylinder 51 has a length from the bottom face 68 of the flange to the distal end 72 that is slightly greater than one half of the outer cross dimension of the FRP tube. The cylinder 51 has eight external ribs 74 extending the length from the bottom face 68 of the flange to the distal end 72 of the cylinder. As can be seen in FIG. 29, the face of the distal end 72 is uniformly flat, so that when the two bearings are in contact within the FRP tube, they make solid contact with one another.

Figure 22:
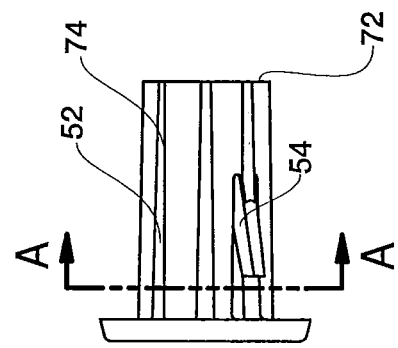
FIG. 22 is a side view of the second embodiment of the invention.
Figure 20:
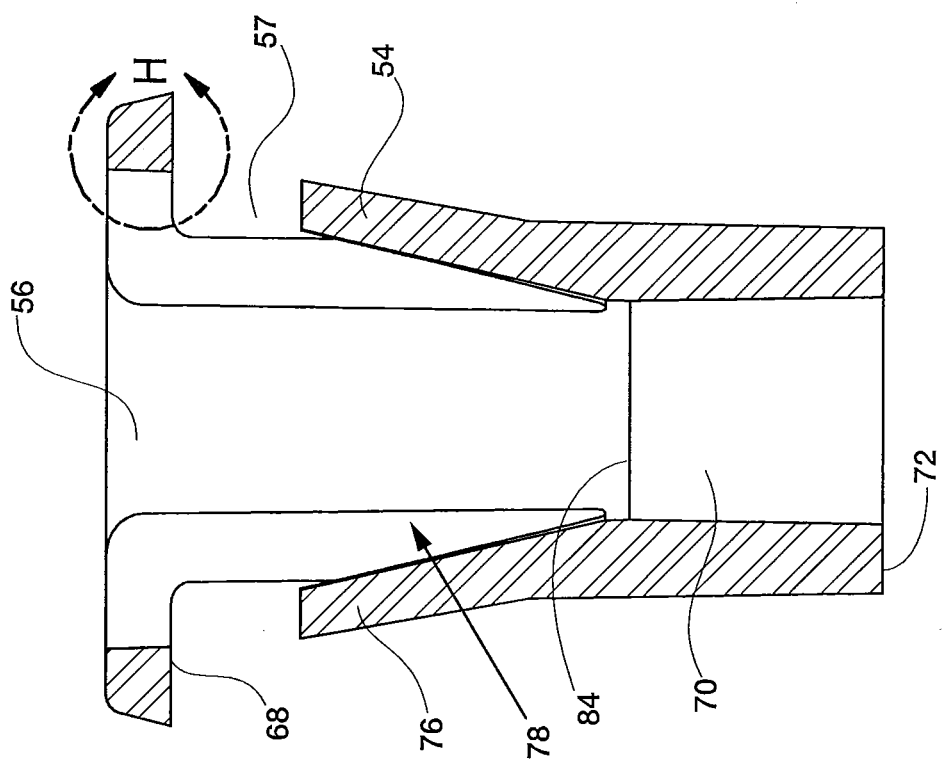
FIG. 20 is a sectional view of FIG. 19 taken along lines E-E and looking in the direction of the arrows.
Figure 25:
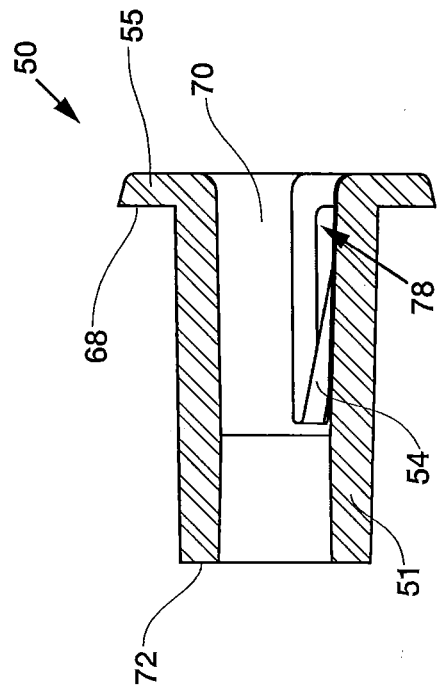
FIG. 25 is a sectional view of FIG. 24 taken along lines C-C and looking in the direction of the arrows.
Figure 26:
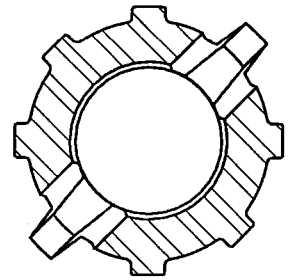
FIG. 26 is a sectional view of FIG. 22 taken along lines A-A and looking in the direction of the arrows.
Figure 23:
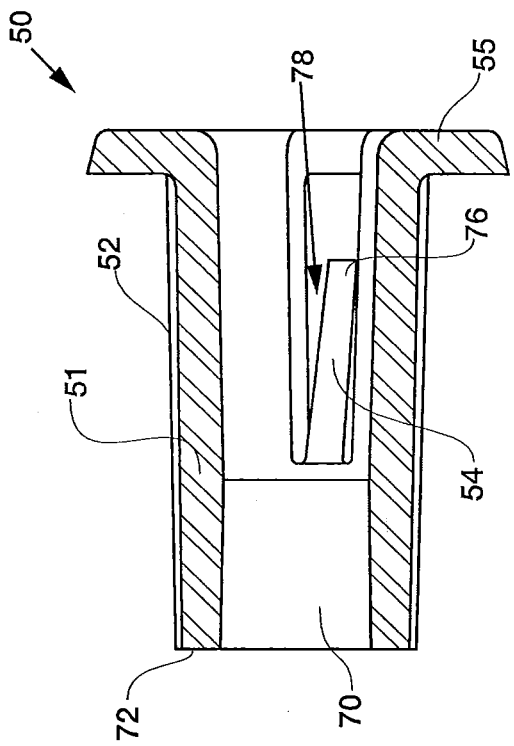
FIG. 23 is a sectional view of FIG. 22 taken along lines B-B and looking in the direction of the arrows.
Figure 24:
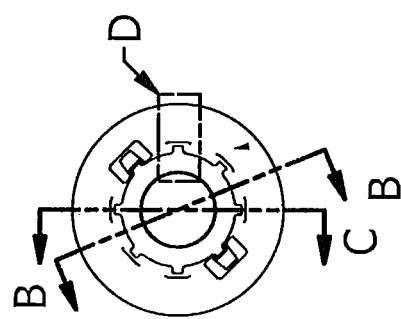
FIG. 24 is a bottom view of the second embodiment of the invention.

The cylinder 51 also has two snap retention latches 54. Embodiments with other numbers of latches (such as one or three) are within the scope of the invention. As best seen in FIGS. 20, 22 and 25, each snap retention latch 54 slopes radially outward from the cylinder 51 with the slope starting toward the distal end 72 of the cylinder and ending in a latch portion 76 at a location that is spaced below the flange 55 and that extends radially outward a distance larger than a diameter of the hole in the side of the FRP tube. The latch portion is free of other cylinder material radially inward of the latch portion as at 78, so the latch portion can flex inward during insertion into the hole in the side of the FRP tube. The resilience of the latch portion 76 returns it to its outward shape after clearing the hole in the side of the FRP tube. As a result, the latch portion prevents the bearing 50 from falling out of the hole in the side of the FRP tube before being held in place with a nut and bolt.

The FRP tube can be pre-drilled with holes for the bearings or drilled at a jobsite. After drilling, the bearings can be installed so that two of them are installed in opposition to one another. There is ample clearance between the FRP tube walls and the latches to accommodate the slight interference between the bearing cylinders 51.

Embodiments of structural bearing apparatus for constructing supporting towers using tubular plastic components according to the invention provide one or more of the following benefits:

Transfer a large portion of the compressive forces on the tube to the cylindrical bodies of the bearings.

Allow for a higher level of torque to be applied to the nut and bolt or other fastener, resulting in better connection integrity. The higher torque allows for 75% proof-tension to be attained in the fastener, assuring the fastener remains tight over the expected life of the structure (such as a cooling tower).

Allow for a much wider window of fastener torque to be safely applied during assembly while still resulting in maintenance of tension in the connection over the life of the structure being assembled.

Eliminate creep of the FRP tubing resulting in fasteners becoming loose over time. Creep is avoided by avoiding fractures and undue bowing.

Distribute compressive, shear and torsional forces over a large flange face of increased thickness, producing a friction-type connection.

Press into a hole of tightly controlled dimension.

Snap into a larger hole and be retained until final assembly.

Allow for a wide tolerance on the diameter of the receiving hole.

Be able to be preassembled in factory or field location. As a result the invention can be considered to be an FRP tube or channel with at least one installed bearing as described.

Be manufactured of an engineering-grade polymer using injection molded process in high volume at a low cost, but is not limited to that material or process. Nylon is not preferred because it is hydroscopic. Polypropylene is also not preferred due to inadequate strength and high flammability, but many other engineering grade polymers may be used. In some cases a metal die-cast or sintered-powdered metal process can be used to fabricate the part.

Be used for the construction of cooling towers, but is not limited to that application.

Be used for hollow tubing made of FRP material, but is not limited to use with only that material.

One embodiment is designed for tubing that is 3.5" x 3.5" outside dimensionally, other sizes can be used. The design can be extended to larger or smaller, square or rectangular structural tubing sizes. The bearing can also be varied in sized to work with various dimensions of bolts and nuts.

One embodiment is designed for use with ½-inch diameter fastener system, but other designs within the scope of the invention can be developed for use with structural fasteners of other sizes.

The preferred embodiment provides for lead-in for the incoming fastener and a self-alignment lead-in on the opposing bearing.

The bearings helps keep bolt threads out of contact with the FRP tube.

Bearing sheer stresses are more uniformly distributed in the clearance holes and the forces in the overall structural system are better distributed between the tube, strap or channel, and bolt so the bearing surfaces in the FRP tubes are not the weak link in the system. A much stronger, more consistent, and more durable structure can be expected. It's not unusual for the diagonal members of typical cooling towers to routinely withstand cyclic loads of more than 6,200 pounds. Peak loading can exceed 8,500 pounds during severe hurricane conditions or seismic events.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A structural element suitable for use in assembling a cooling tower comprising a tube made of Fiberglass Reinforced Polymer (FRP tube) of square or rectangular cross section so as to have an outer cross dimension and an inner open space with an inner cross dimension and having aligned coaxial holes in opposite sides of the FRP tube, and two structural supporting bearings, one in each of the aligned coaxial holes on opposite sides of the FRP tube to protect the FRP tube when the FRP tube is connected to another item with a nut and bolt, each bearing being a molded plastic item having a cylinder and a flange that has a bottom face at one end of the cylinder, an axial bore through the flange and cylinder, the cylinder having a length from the bottom face of the flange to a distal end of the cylinder that is slightly greater than one half of the outer cross dimension of the FRP tube, the distal ends of the cylinders of the bearings contacting each other within the open space in the FRP tube and at least one of the flanges of the bearings being slightly spaced from respective outside faces of the FRP tube, whereby a bolt can be extended through the bores of the bearings and receive a nut on an opposite side of the FRP tube, and when the nut is tightened onto the bolt the bearings compress sufficiently so that the flanges are pressed into contact with their respective outside faces of the FRP tube.

2. A structural element suitable for use in assembling a cooling tower as claimed in claim 1 wherein the cylinders each have a length to enable a nut to be tightened onto the bolt to compress the flanges sufficiently to torque the bolt to 75% of the maximum rating of the bolt.

3. A structural element suitable for use in assembling a cooling tower as claimed in claim 1 wherein the cylinders are of a length so that the flanges of the bearings are spaced 0.005 inch from the outside faces of the FRP tube before being compressed by the nut and bolt.

4. A structural element suitable for use in assembling a cooling tower as claimed in claim 1 wherein the bores of the bearings are tapered from a wider end at the flange to a narrower portion toward the distal end.

5. A structural element suitable for use in assembling a cooling tower as claimed in claim 1 wherein the cylinders each have external ribs extending the length from the bottom face of the flange to the distal end of the cylinder.

6. A structural element suitable for use in assembling a cooling tower as claimed in claim 1 wherein the cylinders each have eight external ribs extending the length from the bottom face of the flange to the distal end of the cylinder.

7. A structural element suitable for use in assembling a cooling tower as claimed in claim 1 wherein the cylinders each have a snap retention latch sloping radially outward from the cylinder with the slope starting toward the distal end of the cylinder and ending at a location that is spaced below the flange and that extends radially outward a distance slightly beyond an edge of the hole in the side of the FRP tube.

8. A structural element suitable for use in assembling a cooling tower as claimed in claim 1 wherein the cylinders each have a snap retention latch sloping radially outward from the cylinder with the slope starting toward the distal end of the cylinder and ending in a latch portion at a location that is spaced below the flange and that extends radially outward a distance slightly beyond an edge of the hole in the side of the FRP tube, the latch portion being free of other cylinder material radially inward of the latch portion, so the latch portion can flex inward during insertion into the hole in the side of the FRP tube and outward after clearing the hole in the side of the FRP tube to prevent the bearing from falling out of the hole in the side of the FRP tube before being held in place with a nut and bolt.

9. A structural element suitable for use in assembling a cooling tower as claimed in claim 1 wherein each cylinder has a snap retention latch extending radially outward a distance beyond an edge of the hole in the side of the FRP tube that prevents the bearing from falling out of the hole in the side of the FRP tube before being held in place with a nut and bolt.

10. A method of assembling a cooling tower comprising
providing a structural tube made of Fiberglass Reinforced Polymer (FRP tube) of square or rectangular cross section that has an outer cross dimension and an inner open space with an inner cross dimension and having aligned coaxial holes in opposite sides of the FRP tube,
inserting two structural supporting bearings in each of the aligned coaxial holes on opposite sides of the FRP tube until distal ends of the bearings contact one another within the open space in the FRP tube and the flange of at least one of the bearings remain spaced slightly from the outside face of the FRP tube,
extending a bolt through aligned bores in the bearings, and
tightening a nut to a distal end of the bolt to compress the bearings sufficiently so that the flanges are pressed into contact with their respective outside faces of the FRP tube.

11. A method as claimed in claim 10 wherein tightening the nut comprises compressing the flanges sufficiently to torque the bolt to 75% of the maximum rating of the bolt.

12. A method as claimed in claim 10 wherein inserting two structural supporting bearings includes flexing snap retention latches on the bearings to prevent the bearings from falling out of the hole in the side of the FRP tube before being held in place with a nut and bolt.

* * * * *